(12) United States Patent
Schmitt et al.

(10) Patent No.: US 7,064,817 B1
(45) Date of Patent: Jun. 20, 2006

(54) METHOD TO DETERMINE AND ADJUST THE ALIGNMENT OF THE TRANSMITTER AND RECEIVER FIELDS OF VIEW OF A LIDAR SYSTEM

(75) Inventors: Randal L. Schmitt, Tijeras, NM (US); Tammy D. Henson, Albuquerque, NM (US); Leslie J. Krumel, Cedar Crest, NM (US); Philip J. Hargis, Jr., Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 222 days.

(21) Appl. No.: 10/780,814

(22) Filed: Feb. 17, 2004

Related U.S. Application Data

(60) Provisional application No. 60/517,344, filed on Nov. 4, 2003.

(51) Int. Cl.
*G01B 11/26* (2006.01)
*G01C 1/00* (2006.01)

(52) U.S. Cl. ............... 356/139.03; 356/3.01; 356/4.01; 356/139.01; 356/152.1

(58) Field of Classification Search ........... 356/4.01
See application file for complete search history.

(56) References Cited

U.S. PATENT DOCUMENTS

| | | | |
|---|---|---|---|
| 3,574,467 A | 4/1971 | Paine et al. | |
| 3,781,552 A | 12/1973 | Kadrmas | |
| 4,889,425 A * | 12/1989 | Edwards et al. | 356/141.3 |
| 5,825,464 A | 10/1998 | Feichtner | |
| 5,872,626 A * | 2/1999 | Lipscomb | 356/141.3 |
| 6,608,677 B1 | 8/2003 | Ray et al. | |
| 2002/0126296 A1 * | 9/2002 | Duquette et al. | 356/614 |

* cited by examiner

Primary Examiner—Thomas H. Tarcza
Assistant Examiner—Luke D. Ratcliffe
(74) Attorney, Agent, or Firm—Carol I. Ashby

(57) ABSTRACT

A method to determine the alignment of the transmitter and receiver fields of view of a light detection and ranging (LIDAR) system. This method can be employed to determine the far-field intensity distribution of the transmitter beam, as well as the variations in transmitted laser beam pointing as a function of time, temperature, or other environmental variables that may affect the co-alignment of the LIDAR system components. In order to achieve proper alignment of the transmitter and receiver optical systems when a LIDAR system is being used in the field, this method employs a laser-beam-position-sensing detector as an integral part of the receiver optics of the LIDAR system.

21 Claims, 2 Drawing Sheets

METHOD TO DETERMINE AND ADJUST THE ALIGNMENT OF THE TRANSMITTER AND RECEIVER FIELDS OF VIEW OF A LIDAR SYSTEM

This application claims the benefit of U.S. Provisional Application No. 60/517,344, filed on Nov. 4, 2003.

The United States Government has rights in this invention pursuant to Department of Energy Contract No. DE-AC04-94AL85000 with Sandia Corporation

BACKGROUND OF THE INVENTION

This invention relates to a method for operating a laser-based detection system and more particularly to a method to determine the alignment of the transmitter and receiver fields of view of a light detection and ranging (LIDAR) system. LIDAR systems are used to measure distances and properties of distant objects. Among the many uses of LIDAR are the measurement of clouds, aerosols, water vapor, pollutants, and forest growth and health. In a LIDAR system, the alignment of a transmitted laser beam with respect to the field of view of the receiver optics is critical, particularly if the laser beam divergence is a large fraction of the total field of view of the receiver optical system. If the field of view of the receiver optical system is small, the alignment is even more critical. Although the initial alignment of all of the transmitter and receiver optics can be performed in a laboratory using precision optical alignment tooling, (interferometers, autocollimators, and other apparatus well understood by those skilled in the art), these tools are usually not available in the field during actual use of the LIDAR system. In order to allow verification of proper alignment in the field and in-field realignment when necessary, we have invented a laser beam position detector as a integral part of the receiver optics of a LIDAR system that, in combination with a special lateral-transfer retro-reflector/attenuator assembly, enables the rapid, in-field checking of the co-alignment of the transmitted laser beam with respect to the receiver telescope field of view (FOV). It also enables in-field adjustment of the relative alignment of the transmitter and receiver systems to achieve the necessary degree of alignment for LIDAR measurements.

Paine et al. (U.S. Pat. No. 3,574,467) reports a method and apparatus particularly suited for use in aligning an optic system, such as an astronomical telescope, employed as a laser beam projector for projecting a beam of laser light against a celestial target and including therein an arrangement of optically related lenses and mirrors by which light emanating from a celestial target is brought in focus to form an image of the target within the focal plane of the optic system, and characterized by the utilization of a beam splitter having a reflecting surface including a microscopic opening disposed within the path of a projected laser beam, as well as within the path of the light being brought in focus, whereby the laser beam is projected through the optic system toward the target, while the light emanating from the target is brought in focus in the focal plane of the system and then redirected by the reflecting surface of the beam splitter to a second optic system for imaging both the target and the opening formed in the beam splitter for thereby accommodating a visual detection of optical alignment of the system for assuring alignment of the system relative to the target.

Kadrmas (U.S. Pat. No. 3,781,552) reports a transmitting and receiving telescope for use in generalized electromagnetic radiation communication systems, including atmospheric probing systems. The telescope optics, electromagnetic radiation source laser and receiver are coaxially aligned along the telescope axis. The telescope can be constructed with one received field of view or with a plurality of received fields of view. The telescope mirrors have apertures along the telescope axis to allow alignment laser pulse or CW radiation to travel along the telescope axis without being reflected. The preferred electromagnetic radiation source is a laser which can operate in both $TEM_{00}$ and $TEM_{01}$ modes. The $TEM_{00}$ mode is employed for alignment purposes since the energy of this mode is concentrated along the axis. The $TEM_{01}$ mode is used for data acquisition because the energy of this mode is concentrated in a donut shaped region having its hole centered on the axis. Constant intensity illumination is produced in the viewed area during data acquisition by separating the donut into inner and outer annuli along the line of maximum intensity and imaging the two beams to provide 100 percent overlay at the range of interest. A preferred use for this telescope is in atmospheric probing LIDAR systems for measurements of the motion and concentration of the atmospheric environment, particularly pollution measurements. This LIDAR system uses a real time data processing system employing 800-megabit analog to digital converters and a correlation system to transform the acquired data into useable form in real time.

Feichtner (U.S. Pat. No. 5,825,464) reports a calibration system and method including isotropically diffusing high-intensity light emitted from a detection apparatus, with the diffused light being coupled to at least one optical line, typically an optical fiber. In the preferred embodiment, the apparatus to be calibrated is a light detection and ranging (LIDAR) apparatus and the isotropic diffusion is achieved by means of an integrating sphere. For calibrating distance calculations, the optical fiber includes a reflecting mechanism, such as Bragg gratings, at a fixed and known distance from the input end of the optical fiber. The reflecting mechanisms simulate the presence of a remote object at the known distance. For a velocity calculation, a frequency offset may be introduced to the light propagating through the optical fiber, thereby simulating a Doppler shift induced by a moving object. The simulations of the presence and movement of remote objects are used to calibrate the apparatus.

Ray and Sedlacek (U.S. Pat. No. 6,608,677) reports a method and apparatus for remote, stand-off, and high efficiency spectroscopic detection of biological and chemical substances. The apparatus includes an optical beam transmitter which transmits a beam having an axis of transmission to a target, the beam comprising at least a laser emission. An optical detector having an optical detection path to the target is provided for gathering optical information. The optical detection path has an axis of optical detection. A beam alignment device fixes the transmitter proximal to the detector and directs the beam to the target along the optical detection path such that the axis of transmission is within the optical detection path. Optical information gathered by the optical detector is analyzed by an analyzer which is operatively connected to the detector.

In order to allow verification of proper alignment in the field and in-field realignment when necessary, this invention employs a laser beam position detector as a integral part of the receiver optics of a LIDAR system that, in combination with a special lateral-transfer retro-reflector/attenuator assembly, enables the rapid, in-field checking of the co-alignment of the transmitted laser beam with respect to the receiver telescope field of view (FOV). This invention also enables in-field adjustment of the relative alignment of the transmitter and receiver systems to achieve the necessary degree of alignment for LIDAR measurements.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

This invention is a method to determine the alignment of the transmitter and receiver fields of view of a light detection and ranging (LIDAR) system. Additionally, this method can be employed to determine the far-field intensity distribution of the transmitter beam, as well as the variations in transmitted laser beam pointing as a function of time, temperature, or other environmental variables that may affect the co-alignment of the LIDAR system components. In order to achieve proper alignment of the transmitter and receiver optical systems when a LIDAR system is being used in the field, this method employs a laser-beam-position-sensing detector as an integral part of the receiver optics of the LIDAR system.

In one embodiment of the method, this position-sensing detector is used in combination with an attenuator-and-reflector assembly. The co-alignment of the transmitted laser beam from the laser transmitter system can be checked with respect to the receiver telescope field of view using this method. Any deviations from proper alignment can be corrected in an iterative fashion using one or more measurements of the degree of co-alignment coupled with adjustment of the laser transmitter system to improve the degree of co-alignment. An adjustment of at least one of the optical elements of the laser transmitter system that control the pointing direction of the output laser beam is used in this method to achieve proper co-alignment. Additionally, the degree of collimation (or far-field divergence angle and far-field energy distribution) of the transmitted laser beam can be determined by the method of this invention and the adjustment of at least one of the optical elements of the laser transmitter system, such a beam-expanding telescope, can be guided by this method to achieve a sufficiently narrow beam divergence for good LIDAR measurements with the receiver optical system being employed.

Figure 1A:
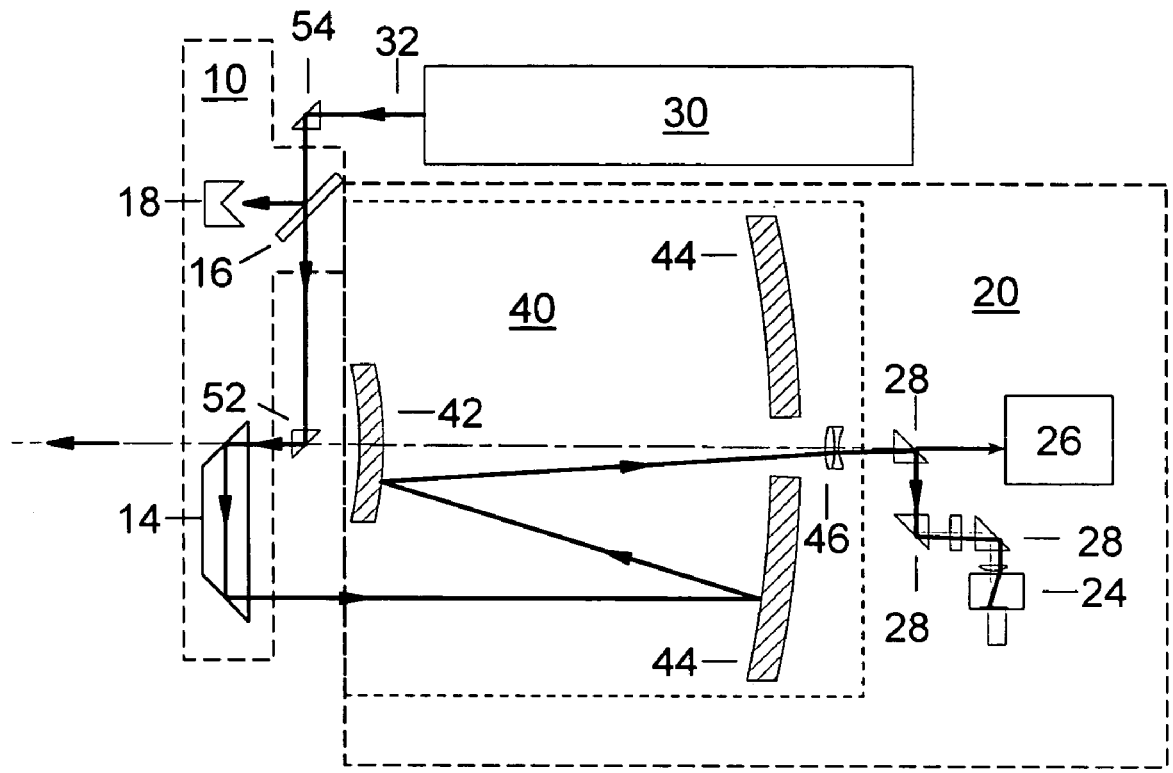
FIG. 1a is a general schematic of a LIDAR system suitable for employment in the method of this invention.
Figure 1B:
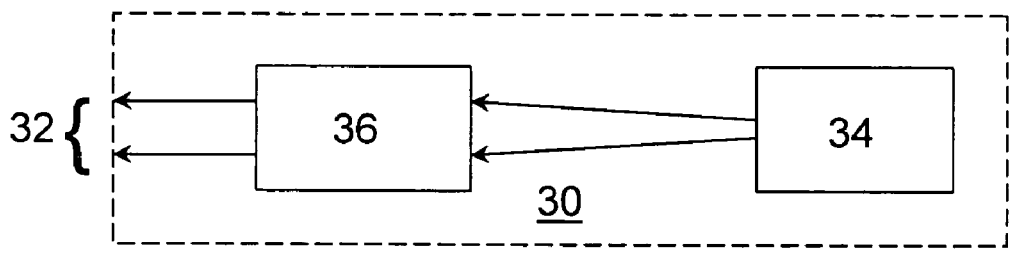
FIG. 1b is a view of a portion of a laser transmitter system.

In one embodiment of the method of this invention shown schematically in FIG. 1, an attenuator-and-reflector assembly (10) is placed on the input end of a receiver telescope (40) that is part of the receiver optical system (20) and is positioned set to intercept the output beam (32) of the laser transmitter system (30). Two turning prisms (54,52) (or mirrors in some embodiments) reflect the transmitted laser beam to be nominally coaxial with the field of view of the LIDAR receiver telescope (40). The telescope (40) comprises both mirrors (42, 44) and lenses (46) to focus the light into the detector portion of the receiver optical system (20). The reflector portion (14) of the assembly functions as a retroreflector that changes the direction of a portion of the input laser beam by a well-defined and known angle, typically 180°, and performs a lateral transfer of the beam to direct that portion of the laser beam into the receiver telescope. The transmitter laser beam (32) can come directly from the output of the laser (34). Alternatively, the laser beam intensity, collimation, and/or profile can be tailored by optical elements before transmission of the beam into the attenuator-and-reflector assembly. One such element is a beam-expander telescope (36) that can be adjusted to achieve the best collimation (minimum divergence) of the laser beam.

The transmitter laser beam (32), after tailoring by such optical elements if present, first passes through a series of attenuators, one of which is represented (16), which serve to reduce the energy of the transmitter beam below the damage threshold for the receiver telescope mirror coatings and for the other optical components and detectors comprising the reflector portion of the attenuator-and-reflector assembly (10) and the receiver optical system (20).

The attenuators (16) are chosen to minimize any change in the laser-beam pointing angle. The number and characteristics of the attenuators depends on the power and wavelength of the transmitter laser and can readily be selected by those skilled in the art. In one embodiment of this method, the attenuators are precision optical flats with negligible wedge angle that reflect a majority of the laser beam out of the optical path that leads into the receiver optical system. This rejected light can be deposited into a beam dump (18) or can be disposed of in another way standard in the art. A small fraction of the beam passes through each optical flat and continues to travel along the optical path toward the receiver optical system. These are optical flats with parallelism between the two faces that is better than 5 µRad so that the beam pointing direction of the transmitted portion of the laser beam is not changed appreciably. In one embodiment, there are a total of four attenuators. The angle deviations add in quadrature when they are randomly oriented. This leads to an angular deviation or angular error on the order of 10 to 15 µRad during the transit of the beam through the attenuators. For a LIDAR system, there is generally assigned a total pointing error budget for the entire LIDAR system and for each of the optical systems contained therein. This value represents a small fraction of the total angular error budget of 140 µRad for the laser transmitter system in one embodiment of this method.

After leaving the attenuator section, the attenuated transmitter laser beam is reflected from a final turning optic, such as a prism (52) (in one embodiment, mounted on the telescope secondary mirror (42)) and enters the retro-reflecting prism assembly (14) which changes the beam direction by 180° without inducing additional angular deviation (an angular deviation of less than 3 µRad has been demonstrated to work well) and translates the beam so that it is injected into the receiver telescope. For the purposes of this invention, antiparallel beams are defined as those beams differing in their propagation direction by 180°.

The beam is reflected and transmitted by the telescope optics (42,44,46) into the detector region where one or more beam splitters divide this injected beam and direct portions of the injected beam onto the position-sensing means (24) for capturing an image and onto one or more other detectors (26). Other optical components, as determined by the specific location of the various system detectors, can be incorporated in this portion of the receiver system to obtain proper optical alignment of the detectors with their respective portions of the injected beam. The means for capturing an image can be one of several types of equipment currently available or a future means for the same purpose. Some currently available means include but are not restricted to charge-coupled-device (CCD) arrays, intensified charge-coupled-device (ICCD) arrays, charge-injection-device (CID) arrays, and infrared (IR) focal plane arrays. In the following description of the invention, a position-sensing CCD array is employed but with the understanding that another image-capturing means can be used to implement the method of this invention.

The beam splitters (28) can one of any of a variety of types known to those skilled in the optical arts. Among these types of beamsplitters, cube beam splitters and dielectric-coated optical flats are two that are well suited for employment in this method. Cube beam splitters are suitable for use to deflect a portion of the input light without beam displacement or second-surface reflections. Parallel-plate beamsplitters with dielectric or semitransparent metallic coatings can produce some beam displacement and second-surface reflections. These complications can be compensated for by anti-reflection coating the second surface and/or by identifying their contributions during the receiver optical system alignment process.

Figure 2A:
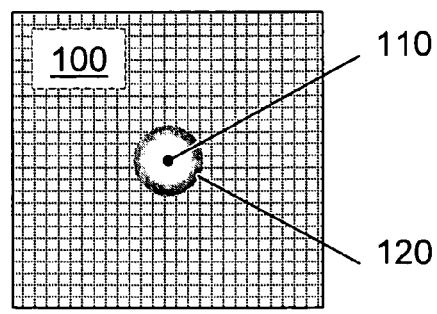
FIG. 2 is a graphical representation of the behavior of the image of the laser beam in a position-sensing CCD array during employment of the method of this invention.

The position-sensing CCD array (24) and the one or more other LIDAR signal detectors (26) of the receiver optical system (20) are, in one embodiment, rigidly affixed within the receiver optical system. To use this method to achieve proper alignment of the transmitter and receiver systems, the portion of the position-sensing CCD-array that is illuminated when the transmitter and receiver systems are optimally aligned should be determined. In this method, the pixels of the position-sensing CCD array that correspond to the effective center of the field of view of the position-sensing CCD array under conditions that provide optimum LIDAR signal can be determined using a bright light source positioned at a distance sufficient to make it appear to the receiver optical system to be a point source. This light source is imaged on the position-sensing CCD array as a point source. The grid (100) in FIG. 2a is a schematic representation of the pixels of the position-sensing CCD array (24) in FIG. 1a. The effective center of the field of view is indicated schematically as a dot (110).

In a multi-detector LIDAR system, there is usually one detector that is designated to be the primary detector. When the signal from the primary detector (due to the bright light point source) is maximized (as can be readily determined for a particular LIDAR application by one skilled in the LIDAR art,) the position of the bright light source image on the position-sensing CCD array identifies the location where the retro-reflected transmitter-laser beam should be imaged when the transmitter optical system and the receiver optical system are properly aligned.

The location of the image of the laser beam on the CCD array is indicative of its pointing direction and the size and distribution of the image on the position-sensing CCD array is indicative of its beam divergence and far-field energy distribution (FIGS. 2a–e). When the laser transmitter system (30) has the optimum pointing direction, the image of the laser beam (120) on the position-sensing CCD array (24) is centered on the set of pixels corresponding to the effective center of the field of view (110). When the transmitter laser beam (32) has optimum collimation, the image (120) will have a minimum radial extent. The effective center of the field of view (110) does not have to be positioned at the exact center of the CCD array detector; it is only important to determine the position (110) using a calibration method similar to the one described above.

Figure 2B:
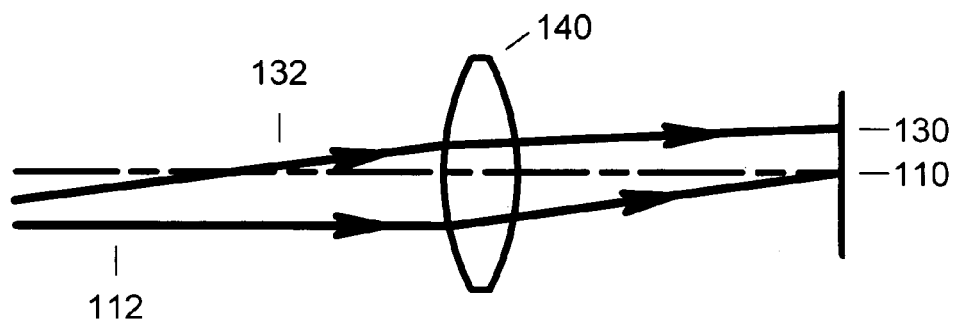

When the pointing direction of the transmitter laser beam is properly aligned (112), it is focused by the receiver optics (schematically represented in FIG. 2b as a lens (140), although multiple and varied optical components can be involved) onto the pixels that correspond to the effective center of the field of view (110). If the pointing direction is not properly aligned, (132), it is focused onto pixels that do not coincide with those corresponding to the effective center of the field of view (110) and the image (120) will be shifted to a different location (130). In this invention, the array detector is placed in the back focal plane of the receiver optical system, and, as a result, angular deviations in the input light (for example, from 112 to 132) are converted to spatial deviations (for example, from 110 to 130) in the detector array. By knowing the effective focal length of the receiver optical system and the effective pixel spacing of the array, one can determine the sensitivity of the position-sensing detector (i.e. angular deviation per pixel). Also, one can determine the sensitivity by means of calibration in the laboratory or in the field using methods known by those skilled in the art.

Figures 2C, 2D, 2E:
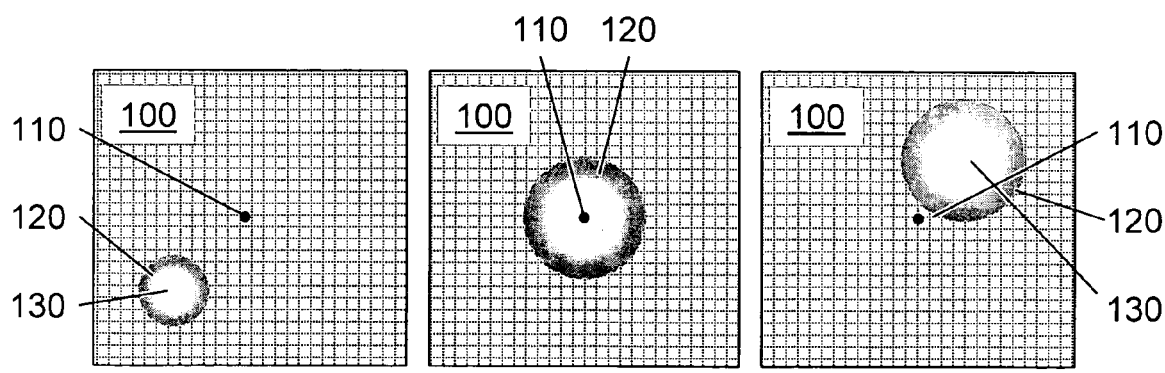

FIGS. 2c, 2d, and 2e illustrate the effects of improper pointing direction with good collimation, proper pointing direction with poor collimation, and both poor collimation and improper pointing direction, respectively. Adjustment of the pointing direction and beam collimation to achieve an image like that illustrated in FIG. 2a can provide optimum performance of the LIDAR system.

The collimation of the transmitter laser beam can be optimized by adjusting a beam-expanding telescope (36) located in the beam path before transmission of the laser beam to the LIDAR target or into the attenuator-and-reflector assembly (10). The quality of the adjustment of this telescope to achieve minimum beam divergence can be determined by the size of the image on the position-sensing CCD array (24) in the receiver optical system.

In one embodiment, a video frame-grabber and laser-beam-profiling software are used to display and record the data from the position-sensing CCD array. Using this approach, the laser-beam pointing, the beam-pointing jitter, the laser-beam divergence, and far-field energy distribution or far-field energy profile can be determined as a function of time. Since the pointing direction and the beam divergence can be altered by changes in environmental conditions such as temperature, humidity, pressure, and vibration, this method can provide information about the stability of these and other system parameters that affect the interpretation of a LIDAR signal and the usefulness of data acquired using a LIDAR system over an extended period of time.

In one embodiment of this method, the alignment of the system can be determined without the use of the attenuator-and-reflector assembly. When the transmitted laser beam strikes a target possessing sufficient scattering efficiency to backscatter enough of the laser light to induce a measurable signal in the position-sensing CCD array, the image of the scattered light can be obtained with the position-sensing CCD array. This enables in-flight (or in-the-field) determination of the transmitter beam/receiver optical system alignment without insertion of the attenuator-and-reflector assembly. For this embodiment to be effective, the target must be placed at a distance far enough away from the LIDAR system to be in a region of sufficient overlap between the transmitted laser beam and the field of view of the position-sensing CCD array. This is often referred to as the geometrical overlap between the receiver and transmitter fields of view and is a function of the specific design of the LIDAR system. Most LIDAR systems have an effective "blind spot," which is a region where the central obscuration caused by the telescope secondary mirror (42) prevents any backscattered light from that region from reaching the detectors. Furthermore, to be most effective, the distance from the light-scattering object to the LIDAR system must be such that the image of the scattered light formed on the position-sensing CCD array is not too blurred to be useful. As a practical matter, the pointing direction of the transmitted laser beam can be determined by calculating the centroid of the recorded image even if it is quite blurred.

In general, the light intensity distribution recorded on the position-sensing CCD array will occupy more than one pixel, even if it comes from a point source, and it may become necessary to calculate a location on the CCD-array that best represents the center of this image. It is common practice to use the centroid of the image to mark the center of beam. Mathematically, the centroid is the first moment of the intensity distribution, analogous to the center of mass in a mechanical system. For a circularly symmetric intensity distribution, as illustrated in FIG. 2c, the centroid is located at the point 130.

This method can be used with both coaxial and biaxial LIDAR systems. A coaxial LIDAR system is one in which the laser beam is transmitted along the same axis as the center of the receiver field of view. An example of a coaxial LIDAR is illustrated in FIG. 1a. Most coaxial LIDAR systems require optical turning prisms (52,54) or mirrors to direct the laser beam (which is commonly located off the center of the telescope) to become coaxial with the receiver field of view. A non-coaxial LIDAR, sometimes referred to as a biaxial LIDAR, has the laser beam transmitted along a line that is not coincident with the center of the field of view of the receiver. In many cases the transmitted laser beam is directed to be nearly parallel to the center of the field of view of the receiver, but displaced a distance from it.

Since the position-sensing CCD array can be calibrated in terms of angular sensitivity (the angle as a function of distance or pixels across the array), the transmitter laser beam can be positioned to be co-linear with the primary sensor's field of view or it can be offset by a known amount. In one embodiment of this method using a coaxial LIDAR system, it is most often desired to transmit the laser beam coaxially with respect to the field of view of the primary LIDAR detector. In such a case, the laser spot would be positioned to align with the previously determined pixel or pixels that correlate with the center of the field of view. In an embodiment of this method using a biaxial LIDAR system, the pixel or pixels that correlate with excellent alignment with respect to the primary LIDAR detector can depend on the distance from the LIDAR system to the scattering target. This method can be used to guide the adjustment of the transmitted-laser-beam pointing angle to optimize the geometrical overlap between the transmitter and receiver fields of view.

In one embodiment, the entire field of view of the position-sensing CCD array is 3.3 mRad (horizontal) by 2.0 mRad (vertical). The nominal field of view of the principal LIDAR detector, a spectrometer/intensified-charge-coupled-device (ICCD) detector system, is 850 µRad. Using a bright light point source and a laboratory collimator as the optical input (to produce a virtual point source), the receiver system is aligned for maximum signal from the principal LIDAR detector. Next the pixels comprising the image of this point source on the position-sensing CCD array that correspond to such maximized optical alignment are identified. The location of the centroid of these image pixels defines the center of the field of view of the primary LIDAR detector. This position is subsequently used as a reference position whenever it is necessary to determine the alignment of any optical input to the system with respect to the center of the field of view of the primary LIDAR sensor.

The angular sensitivity of the position-sensing CCD system can be determined by changing the input angle of the virtual point source by known amounts and determining the centroid of the image of the virtual point source in each case. The input angle of the light from the virtual point source may be varied by many techniques known to those skilled in the art. One such technique is to use a turning mirror with an angular position encoder to allow the input beam angle to be varied in a precise and measurable way.

The pointing of the laser beam is then adjusted by using turning prisms, mirrors, or other optics in the transmitter beam line until the centroid of its image on the position-sensing CCD array is located at the reference position previously determined (i.e. the center of the field of view of the primary LIDAR detector). Once the centroid of the image of the retro-reflected transmitted laser beam is properly aligned to the center of the field of view of the receiver, the far-field beam divergence can be determined by measuring the intensity distribution of the image of the laser beam on the CCD array. If the far-field divergence of the transmitted laser does not meet the requirements of the LIDAR system design, the divergence can be adjusted by adjusting the collimation of a beam-expanding telescope or by another method. As adjustments to the beam divergence are made, the beam divergence can be repeatedly measured using the position-sensing CCD array. When the measured beam divergence is within acceptable limits for the particular LIDAR, the adjustment for proper centering of the laser beam with respect to the LIDAR field of view may be repeated to ensure that the beam collimation adjustments did not misalign the pointing of the transmitted laser beam.

After the alignment and collimation of the transmitted laser beam are optimized as described above, the position-sensing CCD array can be used to monitor and record the laser-beam pointing jitter and changes in the far-field energy distribution as a function of time or environmental parameters such as temperature, pressure, humidity, and vibration. This procedure is used to verify that the laser pointing performance is adequate to meet the specifications of the LIDAR and also to verify that the construction of the LIDAR is adequate to maintain proper alignment through expected temperature, pressure, humidity, and vibrational environments under which the LIDAR is expected to operate properly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for aligning a laser transmitter system and a receiver optical system comprising:
  a) placing an attenuator-and-reflector assembly on a receiver optical system;
  b) reflecting a first portion of an output laser beam from a laser transmitter system into said attenuator-and-reflector assembly:
  c) attenuating said first portion of said output laser beam to a power level insufficient to damage said receiver optical system and a reflector assembly of said attenuator-and-reflector assembly;

d) reflecting said first portion of said output laser beam to change direction so as to direct said first portion of said output laser beam into said receiver optical system;
e) inputting said first portion of said output laser beam into said receiver optical system;
f) directing a second portion of said first portion of said output laser beam onto a means for capturing an image located at a back focal plane of said receiver optical system to generate an image of said second portion;
g) determining a position and an intensity profile of said image of said second portion of said output laser beam using said means for capturing an image; and
h) adjusting at least one optical element of said laser transmitter system when said image of said second portion of said output laser beam does not impinge upon a desired region of a plurality of pixels of said means for capturing an image.

2. The method of claim 1 wherein steps b) through h) are repeated until said image of said second portion of said output laser beam impinges upon said desired region of said pixels.

3. The method of claim 1 wherein said at least one optical element changes a pointing direction of said output laser beam originating from said laser transmitter system.

4. The method of claim 3 wherein said pointing direction is repeatedly determined to track a change during a passage of time.

5. The method of claim 3 wherein said pointing direction is repeatedly determined to track a change resulting from a change in an environmental condition.

6. The method of claim 5 wherein said environmental condition is selected from the group consisting of temperature, humidity, pressure, and vibration.

7. The method of claim 1 wherein said at least one optical element changes a collimation of said output laser beam originating from said laser transmitter system.

8. The method of claim 7 wherein said collimation is repeatedly determined to track a change during a passage of time.

9. The method of claim 7 wherein said collimation is repeatedly determined to track a change resulting from a change in an environmental condition.

10. The method of claim 9 wherein said environmental condition is selected from the group consisting of temperature, humidity, pressure, and vibration.

11. The method of claim 1 wherein said intensity profile of said image is employed as a measure of a far-field energy profile of said output laser beam.

12. The method of claim 1 wherein said means for capturing an image is selected from the group consisting of a CCD array, an intensified CCD array, a CID array, and an IR focal plane array.

13. The method of claim 1 wherein said reflected direction of said first portion of said output laser beam is antiparallel to an original direction of said output laser beam.

14. The method of claim 1 wherein the desired location on said means for capturing an image is determined by a sequence of steps comprising:
a) pointing said receiver optical system toward a light source positioned at a distance sufficient to make said light source appear to be a point source;
b) adjusting an at least one optical element of said receiver optical system to maximize a signal from a primary LIDAR detector resulting from a first portion of light from said light source;
c) directing a second portion of light from said first portion of light from said light source onto a means for capturing an image located at a back focal plane of said receiver optical system to generate an image of said second portion; and
d) identifying a desired location of a plurality of pixels by determining said location on said means for capturing an image where said second portion of light from said light source is imaged.

15. A method for aligning a laser transmitter system and a receiver optical system comprising:
a) scattering a first portion of a laser beam from a laser transmitter system into a receiver optical system;
b) directing a second portion of said first portion of said output laser beam onto a means for capturing an image located at a back focal plane of said receiver optical system to generate an image of said second portion;
c) determining a position and an intensity profile of said image of said second portion of said output laser beam using said means for capturing an image;
d) adjusting a pointing direction of said output laser beam originating from said laser transmitter system when said image of said second portion of said output laser beam does not impinge upon a desired region of a plurality of pixels of said means for capturing an image; and
e) adjusting at least one optical element of said laser transmitter system when said image of said second portion of said output laser beam does not impinge upon said desired region of said plurality of pixels of said means for capturing an image.

16. The method of claim 15 wherein steps a) through e) are repeated until said image of said second portion of said output laser beam impinges upon said desired region of said pixels.

17. The method of claim 15 wherein said at least one optical element changes a pointing direction of said output laser beam originating from said laser transmitter system.

18. The method of claim 15 wherein said at least one optical element changes a collimation of said output laser beam originating from said laser transmitter system.

19. The method of claim 15 wherein said means for capturing an image is selected from the group consisting of a CCD array, an intensified CCD array, a CID array, and an IR focal plane array.

20. The method of claim 15 wherein said reflected direction of said first portion of said output laser beam is antiparallel to an original direction of said output laser beam.

21. The method of claim 15 wherein the desired location on said means for capturing an image is determined by a sequence of steps comprising:
a) pointing said receiver optical system toward a light source positioned at a distance sufficient to make said light source appear to be a point source;
b) adjusting an at least one optical element of said receiver optical system to maximize a signal from a primary LIDAR detector resulting from a first portion of light from said light source;
c) directing a second portion of light from said first portion of light from said light source onto a means for capturing an image located at a back focal plane of said receiver optical system to generate an image of said second portion; and
d) identifying a desired location of a plurality of pixels by determining said location on said means for capturing an image where said second portion of light from said light source is imaged.

* * * * *